United States Patent
Gonzalez et al.

(10) Patent No.: US 11,385,624 B2
(45) Date of Patent: Jul. 12, 2022

(54) GENERATING A MANUFACTURING JOB

(71) Applicant: HEWLETT-PACKARD DEVELOPMENT COMPANY, L.P., Houston, TX (US)

(72) Inventors: Sergio Gonzalez, Sant Cugat del Valles (ES); Jordi Gonzalez Rogel, Sant Cugat del Valles (ES); Matthew A. Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1000 days.

(21) Appl. No.: 16/075,600

(22) PCT Filed: Apr. 24, 2017

(86) PCT No.: PCT/US2017/029049
§ 371 (c)(1),
(2) Date: Aug. 4, 2018

(87) PCT Pub. No.: WO2018/199877
PCT Pub. Date: Nov. 1, 2018

(65) Prior Publication Data
US 2021/0208573 A1  Jul. 8, 2021

(51) Int. Cl.
*G05B 19/418* (2006.01)
*G06F 40/205* (2020.01)
(Continued)

(52) U.S. Cl.
CPC ... *G05B 19/41865* (2013.01); *G05B 19/4183* (2013.01); *G06F 40/20* (2020.01); *G06F 40/205* (2020.01); *B33Y 50/02* (2014.12)

(58) Field of Classification Search
CPC .......... G05B 19/41865; G05B 19/4183; B33Y 50/02; B29C 64/386; B29C 64/171
(Continued)

(56) References Cited

U.S. PATENT DOCUMENTS 6,898,477 B2 * 5/2005 Loughran .......... G05B 19/4083
                                                       700/119
8,612,040 B2 * 12/2013 Thomas ................. G06T 17/00
                                                       700/98
(Continued)

FOREIGN PATENT DOCUMENTS

| CN | 104282040 A | 1/2015 | |
| WO | 2017023284 A1 | 2/2017 | |
| WO | WO-2017023284 A1 * | 2/2017 | ........... B29C 64/171 |

OTHER PUBLICATIONS

Kantareddy, "Designing for Metal Additive Manufacturing: Design Challenges with Three Industry Relevant Components", Aug. 2016, 120 pages.

*Primary Examiner* — Stephen S Hong
*Assistant Examiner* — Broderick C Anderson
(74) *Attorney, Agent, or Firm* — HP Inc. Patent Department

(57) ABSTRACT

An additive manufacturing apparatus includes an additive manufacturing engine and an input to receive a plurality of part files to create a plurality of parts. Each part file includes a description of a part to be created by the additive manufacturing engine. A processor interprets a part file to read the description of the part from the part file, stores at least a portion of the description of the part, and repeats the interpretation and storing for each of the received part files. A job composer generates a manufacturing job using the stored descriptions and using characteristics of the additive manufacturing engine, and provides the generated manufacturing job to the additive manufacturing engine.

18 Claims, 10 Drawing Sheets

(51) Int. Cl.
*G06F 40/20* (2020.01)
*B33Y 50/02* (2015.01)

(58) Field of Classification Search
USPC .......................................... 707/736
See application file for complete search history.

(56) References Cited

U.S. PATENT DOCUMENTS

| | | | |
|---|---|---|---|
| 2006/0041840 A1* | 2/2006 | Blair | G06Q 10/0875 715/249 |
| 2011/0087350 A1* | 4/2011 | Fogel | G06T 19/00 700/98 |
| 2014/0344091 A1 | 11/2014 | Krebs | |
| 2015/0056575 A1 | 2/2015 | Groscurth et al. | |
| 2018/0133969 A1* | 5/2018 | Huang | B29C 64/386 |

\* cited by examiner

GENERATING A MANUFACTURING JOB

BACKGROUND

Additive manufacturing systems enable the generation of three-dimensional objects on a layer-by-layer basis in accordance with a job defining the content to be generated.

BRIEF DESCRIPTION OF THE DRAWINGS

Examples will now be described, by way of non-limiting examples, with reference to the accompanying drawings, in which.

DETAILED DESCRIPTION

Three dimensional (3D) printing, also referred to as additive manufacturing, rapid prototyping or solid freeform fabrication, is a technology for manufacturing a vast variety of objects. Some additive manufacturing systems generate three-dimensional objects through the selective solidification of successive layers of a build material, such as a powdered build material. Some of such systems may solidify portions of a build material by selectively depositing an agent to a layer of build material. Some systems, for example, may use a liquid binder agent to chemically solidify build material where the liquid binder agent is applied.

Other systems, for example, may use liquid energy absorbing agents, or coalescing or fusing agents, that cause build material to solidify when suitable energy, such as infra-red energy, is applied to build material on which an energy absorbing or coalescing agent has been applied. The temporary application of energy may cause portions of the build material on which coalescing agent has been delivered, or has penetrated, to absorb energy. This in turn causes these portions of build material to heat up above the melting point of the build material and to coalesce or fuse. Upon cooling, the portions which have coalesced become solid and form part of the three-dimensional object being generated.

Other systems may use additional agents, such as coalescence modifier or fusion inhibiting agents, in conjunction with coalescing agents. A coalescence modifier agent is an agent that serves, for example, to modify the degree of coalescence of a portion of build material on which the coalescence modifier agent has been delivered or has penetrated.

The production of a three-dimensional object through the selective solidification of successive layers of build material may involve a set of defined operations. An initial process may, for example, be to form a layer of build material from which a layer of the three-dimensional object is to be generated. A subsequent process may be, for example, to selectively deposit an agent to selected portions of a formed layer of build material. In some examples, a subsequent process may be to supply energy to the build material on which an agent has been deposited to solidify the build material. Repeating these processes enables a three-dimensional object to be generated layer-by-layer, through selective solidification of portions of successive layers of build material.

Figure 1:
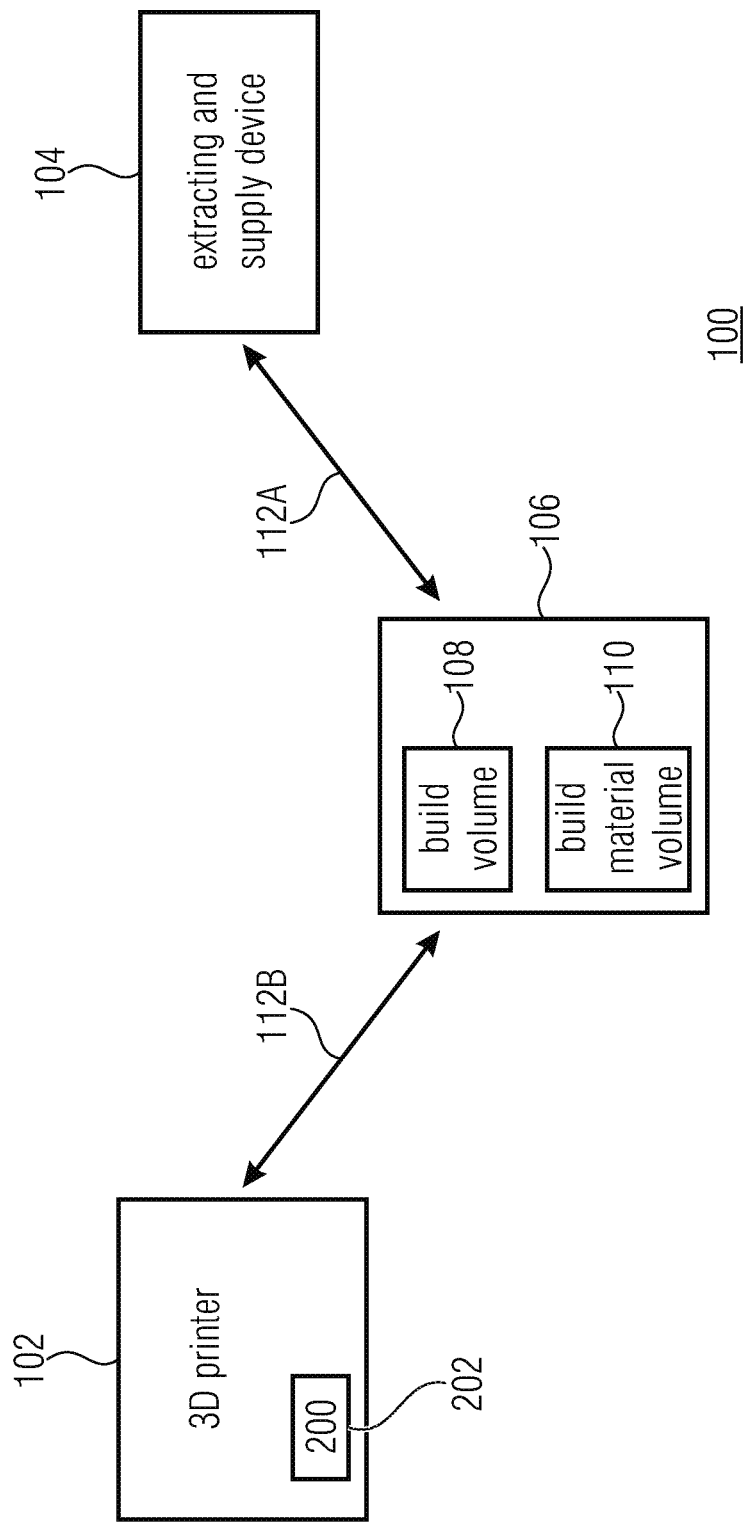
FIG. 1 is an illustration of an additive manufacturing system according to an example.

FIG. 1 shows a simplified illustration of an additive manufacturing system 100 according to an example. The additive manufacturing system 100 includes a 3D printer 102, an extracting and supply device 104, and a transport device 106. The transport device includes a build volume 108, also referred to as a volume to contain an object created by the additive manufacturing system 100, and a build material volume 110, also referred to as a volume to receive a build material. As indicated by arrows 112A and 112B the transport device 106 may cooperate with the 3D printer 102 and the extracting and supply device 104. The 3D printer 102 may receive the transport device 106 and form an object. The 3D printer receives the transport device 106 and obtains the build material from the build material volume 110. The 3D printer 102 uses the build material obtained from the build material volume 110 of the transport device 106 to form the object in the build volume 108 of the transport device 106. The transport device 106 may also be received by the extracting and supply device 104. For example, once a build process has been completed by the 3D printer 102 the object built in the build volume 108 of the transport device 106 is transferred from the 3D printer 102 to the extracting and supply device 104 using the transport device 106. At the extracting and supply device 104, the completed object may be extracted from the build volume 108 of the transport device 106.

Figure 2:
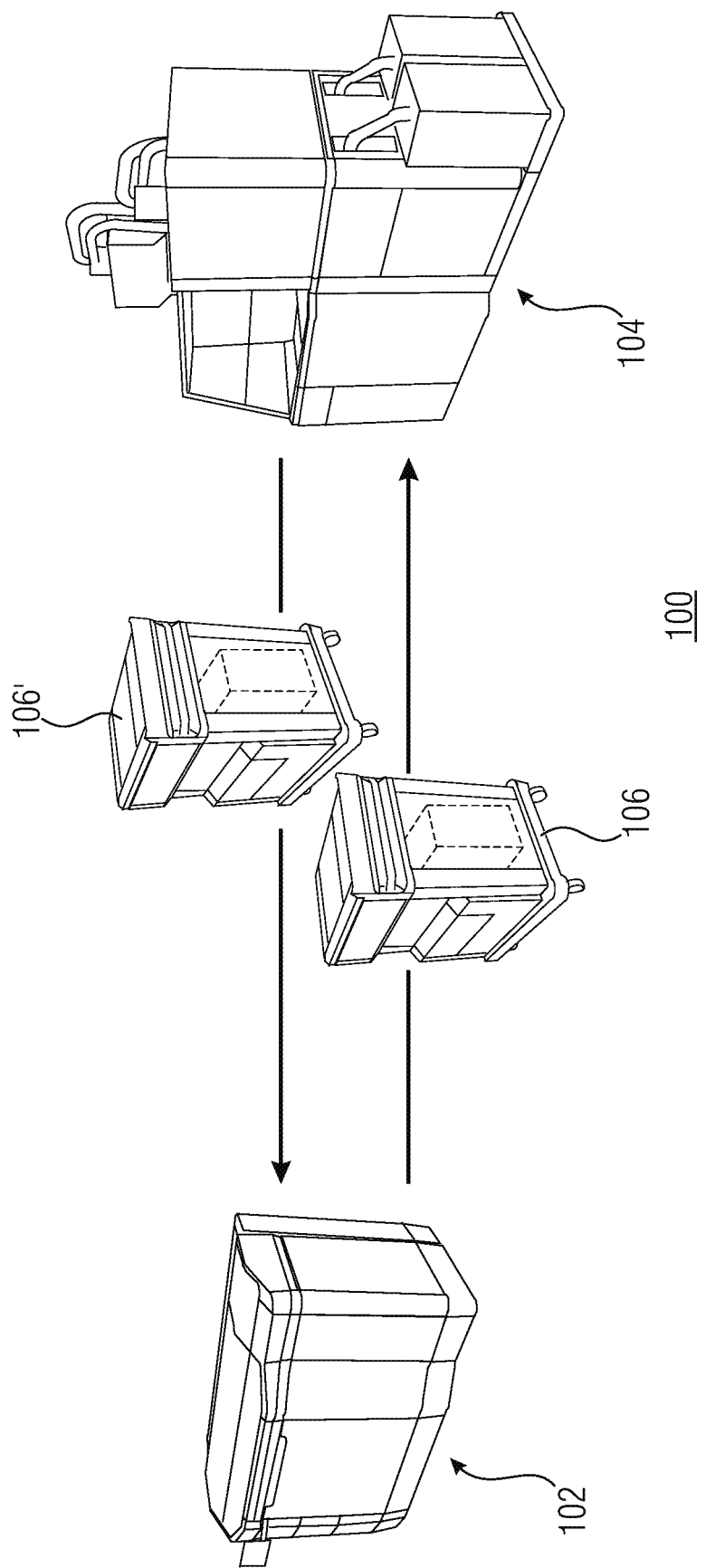
FIG. 2 is an illustration of the additive manufacturing system of FIG. 1 according to another example including two transport devices.

FIG. 2 is an illustration of an example of additive manufacturing system as described with reference to FIG. 1 including two transport devices. The additive manufacturing system 100 includes the 3D printer 102, the extracting and supply device 104, also referred to as a unpacking, cleaning and remixing unit or UCR unit, a first trolley 106 and a second trolley 106'. The trolleys 106, 106' may be substantially identical in structure and the system may have more than two trolleys. The additive manufacturing system including the plurality of trolleys allows for operating the 3D printer 102 and the UCR unit 104 simultaneously so that a quasi-continuous operation may be achieved.

Figure 3:
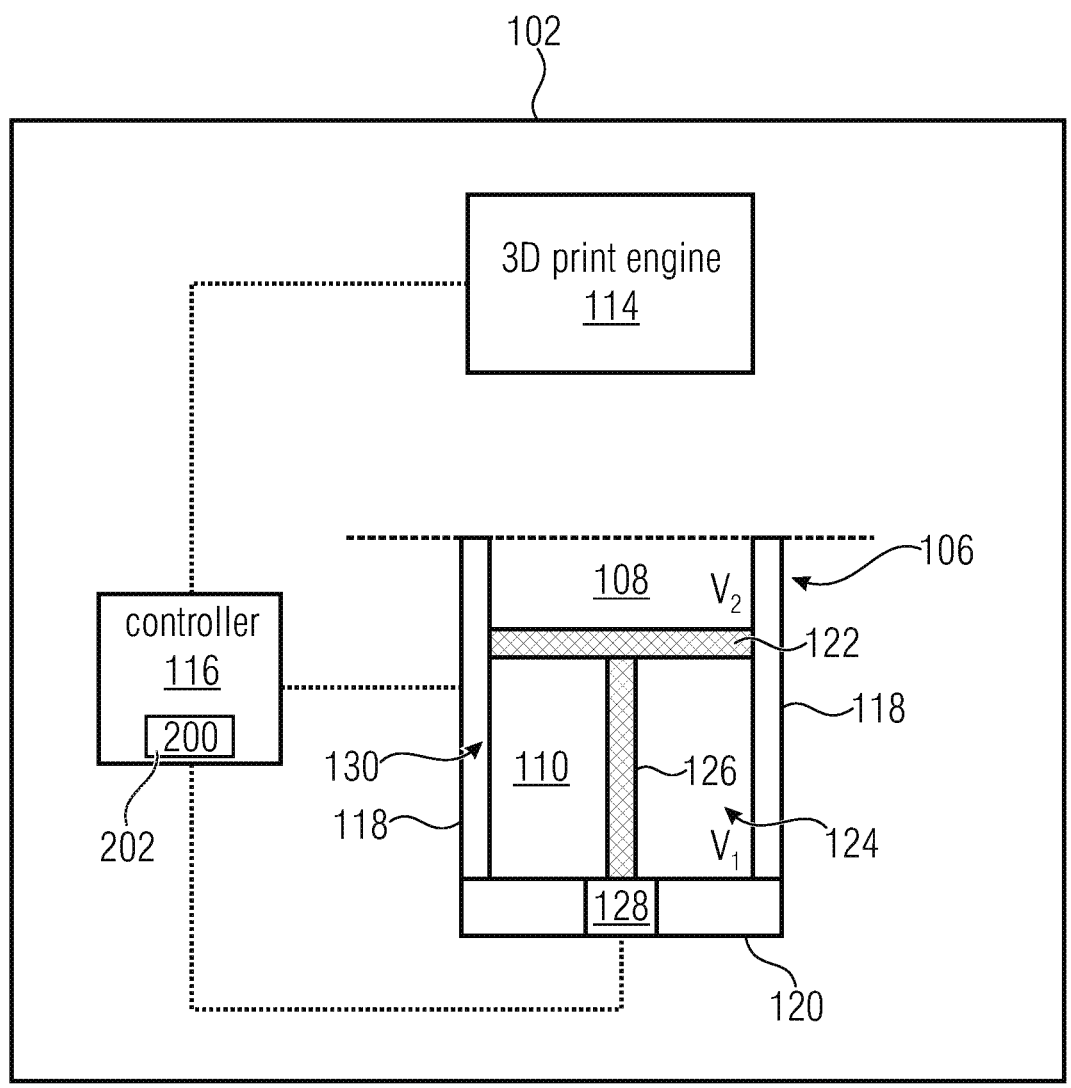
FIG. 3 is an illustration of a 3D printer and a transport device of an additive manufacturing system according to an example.

FIG. 3 is an illustration of a 3D printer 102 and a transport device 106 of an additive manufacturing system according to another example. The 3D printer 102 includes a 3D printing engine 114 to build an object, and a controller 116. The 3D printing engine 114 of the 3D printer may be a 3D printing engine using a coalescing agent technique or a 3D printing engine using a selective laser sintering (SLS) technique. The transport device 106 is disposed in the 3D printer 102. The transport device 106 has the form of a bucket enclosed by side walls 118 and a bottom wall 120. The top side is open, and this is where build material is applied to form an object on a build platform 122. The side walls 118 and bottom wall 120 define a common compartment 124, whose volume is divided by the build platform 122 into the build material volume 110 below the build platform 122 and the build volume 108 above the build platform 122 up to the level of the side walls 118. The upper boundary of the build volume 108 is indicated in FIG. 3 by a dashed line. The build platform 122 is movably mounted and may be connected via a piston 126 to a drive unit 128 which moves the build platform 122 upwards and downwards in the common compartment 124. As the build platform 122 moves upwards and downwards in the common compartment 124, the volume V1 of the build material volume 110 and the volume V2 of the build volume 108 change accordingly. However, the sum of the volumes remains constant and equals the volume V of the common compartment 124, V1+V2=V=constant. The common compartment 124, also referred to as storage compartment, stores the build material for the additive manufacturing process, such as a plastic, metal, ceramic, or glass powder. The build material is transported from the common compartment 124 to the build volume 108 using a transport unit 130, for example a screw drive integrated into the side walls 118. The controller 116 may be provided to control the 3D printing engine 114 and to control the transport device 106 when disposed in the 3D printer 102. The controller 116 controls the drive unit 128 to move the piston 126 and the build platform 122, and the transport unit 130 to transport the build material from the build material volume 110 to the build volume 108.

Figure 4:
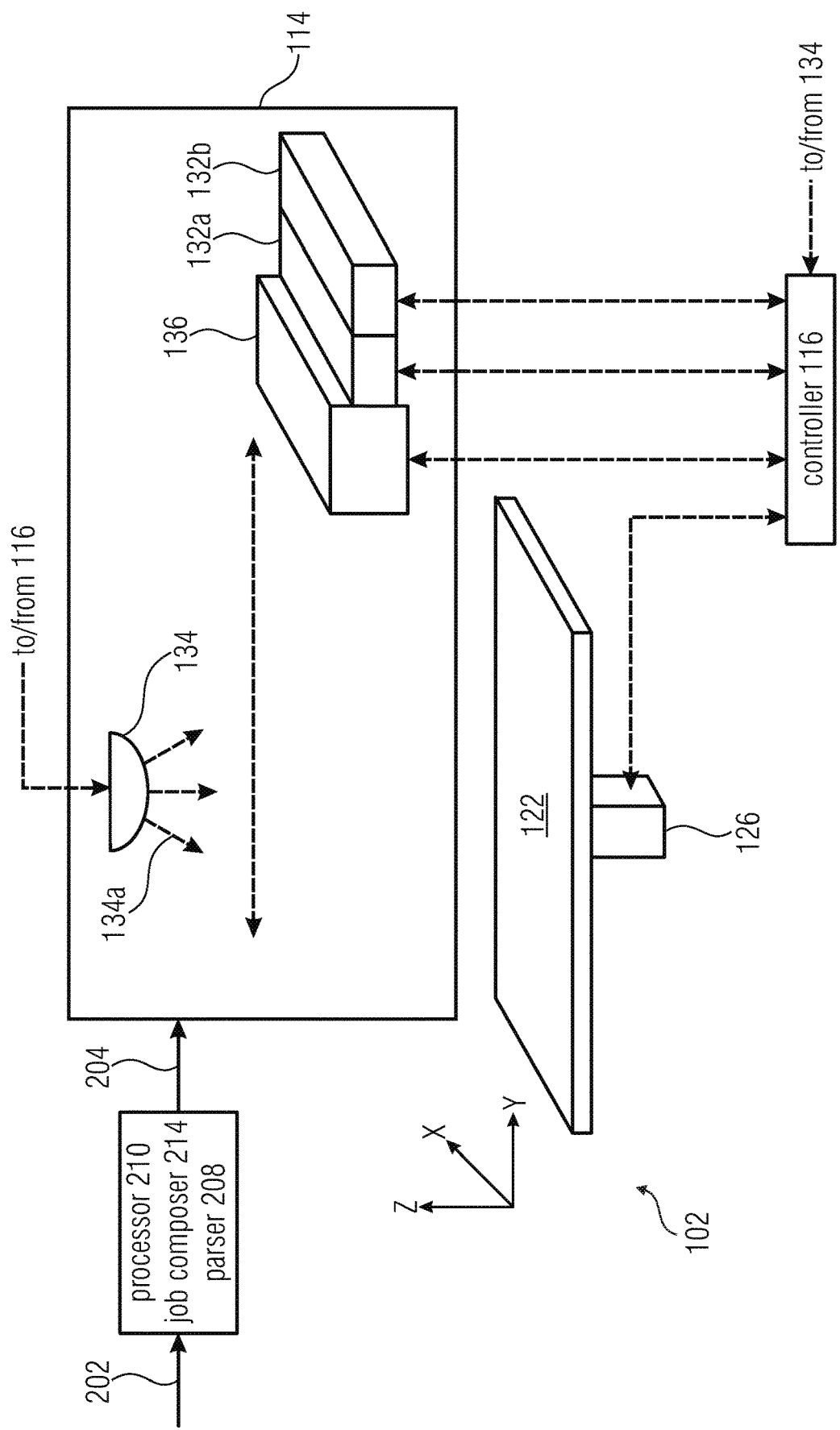
FIG. 4 is a simplified illustration of a 3D printer according to an example using a coalescing agent technique.

FIG. 4 is a simplified illustration of a 3D printer having a 3D printing engine 114 according to an example using a coalescing agent technique. The build material may be a powder-based build material. A powder-based material may be a dry or wet powder-based material, a particulate material, or a granular material. In some examples, the build material may include a mixture of air and solid polymer particles, for example at a ratio of about 40% air and about 60% solid polymer particles. Other examples of suitable build materials may include a powdered metal material, a powdered composite material, a powder ceramic material, a powdered glass material, a powdered resin material, a powdered polymer material, and combinations thereof. In other examples the build material may be a paste, a liquid, or a gel.

The 3D printing engine 114 includes a coalescing or fusing agent distributor 132a to selectively deliver a coalescing or fusing agent to successive layers of build material provided on the build platform 122 and an energy source 134. A suitable coalescing agent may be a printing liquid type formulation comprising carbon black. Such a printing liquid may additionally comprise an absorber that absorbs the radiant spectrum of energy emitted by the energy source 134. For example, the printing liquid may additionally comprise an infra-red light absorber, a near infra-red light absorber, a visible light absorber or a UV light absorber. The agent distributor 132a may be a printhead, such as a thermal printhead or a piezo printhead. The printhead may have arrays of nozzles. In other examples, the agents may be delivered through spray nozzles rather than through printheads. In some examples the printhead may be a drop-on-demand printhead. In other examples the printhead may be a continuous drop printhead. The agent distributor 132a may extend fully across the build platform 122 in a so-called page-wide array configuration. In other examples, the agent distributor 132a may extend across a part of the build platform 122. The agent distributor 132a may be mounted on a moveable carriage to enable it to move bi-directionally across the build platform 122 along the illustrated y-axis. This enables selective delivery of coalescing agent across the entire build platform 122 in a single pass. In other examples the agent distributor 132a may be fixed, and the build platform 122 may move relative to the agent distributor 132a.

In some examples, there may be an additional coalescing agent distributor 132b. The coalescing agent distributors 132a, 132b may be located on the same carriage, either adjacent to each other or separated by a short distance. In other examples, two carriages each may contain the coalescing agent distributors 132a, 132b. In some examples, the additional coalescing agent distributor 132b may deliver a different coalescing agent than the coalescing agent distributor 132a.

The 3D print engine 114 includes a build material distributor 136 to provide, e.g. deliver or deposit, successive layers of build material on the build platform 122. Suitable build material distributors 136 may include a wiper blade and a roller. In the example shown the build material distributor 136 moves along the y-axis of the build platform 122 to deposit a layer of build material. A layer of build material will be deposited on the build platform 122, and subsequent layers of build material will be deposited on a previously deposited layer of build material. In the example shown the build platform 122 is moveable in the z-axis such that as new layers of build material are deposited a predetermined gap is maintained between the surface of the most recently deposited layer of build material and a lower surface of the agent distributor 132a. In other examples, however, the build platform 122 may not be movable in the z-axis and the agent distributor 132a and the build material distributor 136 may be movable in the z-axis.

The energy source 134 applies energy 134a to the build material to cause a solidification of portions of the build material, for example to portions to which an agent, e.g., the coalescing agent, has been delivered or has penetrated. In some examples, the energy source 134 is an infra-red (IR) radiation source, a near infra-red radiation source, or a halogen radiation source. In some examples, the energy source 134 applies energy in a substantially uniform manner to the whole surface of a layer of build material, and a whole layer may have energy applied thereto simultaneously, which may increase the speed at which a three-dimensional object may be generated. In other examples, the energy source 134 applies energy in a substantially uniform manner to a portion of the whole surface of a layer of build material. For example, the energy source 134 may apply energy to a strip of the whole surface of a layer of build material. In these examples the energy source 134 may be moved or scanned across the layer of build material such that a substantially equal amount of energy is ultimately applied across the whole surface of a layer of build material. In some examples, the energy source 134 may be mounted on the moveable carriage. In other examples, the energy source 134 may apply a variable amount of energy as it is moved across the layer of build material, for example in accordance with agent delivery control data. For example, the controller 116 may control the energy source 134 to apply energy to portions of build material on which coalescing agent has been applied.

Figure 5:
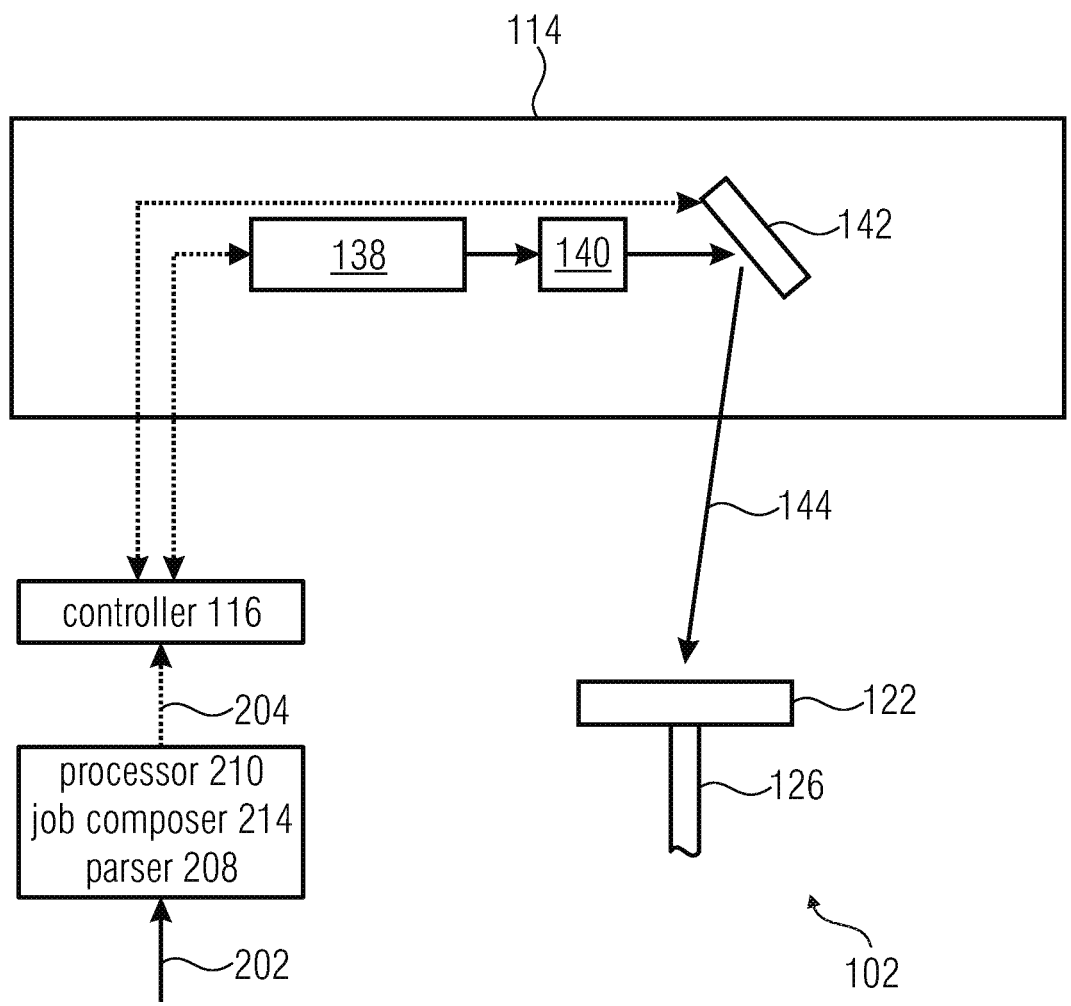
FIG. 5 is a schematic view of 3D printer according to an example using a selective laser sintering (SLS) technique.

FIG. 5 is a schematic view of a 3D printer having a 3D printing engine 114 according to an example using the SLS technique. The 3D printing engine 114 includes an optical system having a laser 138, e.g., an ultraviolet or carbon dioxide laser, an optical lens 140 and an x-y scanning mirror 142. The x-y scanning mirror 142 directs a laser beam 140 emitted from the laser 138 and focused by the lens 140 onto selected portions of the build or powder material on the surface of a powder bed accumulated on the build platform 122. The energy input from the laser beam 144 fuses the powder material, thereby binding the material together to create a solid structure. After each cross-section is scanned, the build platform 122 is lowered by one layer thickness, a new layer of material is formed on top, and the process is repeated until the object is completed. The controller 116 may be provided to control the delivery of build material, the laser 138 and the x-y scanning mirror 142 for directing the laser beam 144 to selected portions of the build platform 122.

An additive manufacturing system or a 3D printer, such as those described above, may generate a certain part or object. The part to be manufactured may be described by a part file generated, for example, by a CAD (Computer Aided Design) tool. The CAD tool may use a 3D language to describe the geometry and other properties of the part. Examples of such a 3D language are STL (STereo Lithography), OBJ or SVX (simple voxels). A CAD tool may use a single 3D language or format for describing a part. In accordance with examples, a CAD tool may use different 3D languages or formats, and one of the formats may be selected to describe a part. For manufacturing the part, a print or manufacturing job is created using the part file, and the manufacturing job is provided to the 3D printer.

During one print session a 3D printer having a certain build volume may process a certain amount of build material so that during the print session a plurality of parts may be generated, e.g., separate or different parts. In such an example, the manufacturing job may define a plurality of parts to be manufactured by the 3D printer during the session. The different parts to be manufactured by the manufacturing job may be described by respective part files having the same or different formats or 3D languages. The part files are provided to an application external from the 3D printer, which processes the received part files to generate a manufacturing job. The manufacturing job is forwarded to the 3D printer, for example in a print-ready sliced raster format or using a universal language, such as the 3MF language. The range of formats/3D languages that may be used for describing a part to be printed in the 3D printing process may be limited by the application used for generating the manufacturing job. The application may not consider characteristics of the 3D printer so that it may not be possible to describe the manufacturing job, for example, as a collection of 3D geometries with a different positioning in the build volume of the 3D printer. Also, the manufacturing job provided by the application limits the 3D printer's capabilities because when sending the pre-processed content, the 3D printer may not have control at the level of the actual part but at the manufacturing job level so that the full characteristics or functionalities of the 3D printer may not be exploited.

Thus, the 3D printer receives the completed print job from an external application, for example in the print-ready raster format or using a generic language, such as the 3MF language. The print job is generated using the description of the different parts by the respective part files. The user or the users have to send the part files describing the parts to be constructed to the external application to generate the job using the part files. The part files may not be send directly to the 3D printer. Besides sending the part files to an intermediate entity for generating the job, this also limits the possibilities the 3D printer has with regard to the control of forming the actual parts and where to form them. The printer may not control, for example, how respective parts may be optimally placed in view of the 3D printer's parameters, such as the size and accessibility of the build bed.

Examples of the technique described move the process for creating the job from the external application into the 3D printer to allow a user or a plurality of users to directly send the part files to the 3D printer to create the job internally in the 3D printer. Rather than providing a completed construction or print job to the 3D printer, the different part files having the same or different formats are received at the 3D printer, are interpreted by the 3D printer and, using the description of the parts retrieved from the different part files and the characteristics of the 3D printer, the actual print job is created or composed by the 3D printer. Creating or composing the job may include an optimization process for optimally placing the plurality of parts in the printable bed of the 3D printer, for example by solving a 3D bin packing optimization job using the interpreted part description.

Figure 6:
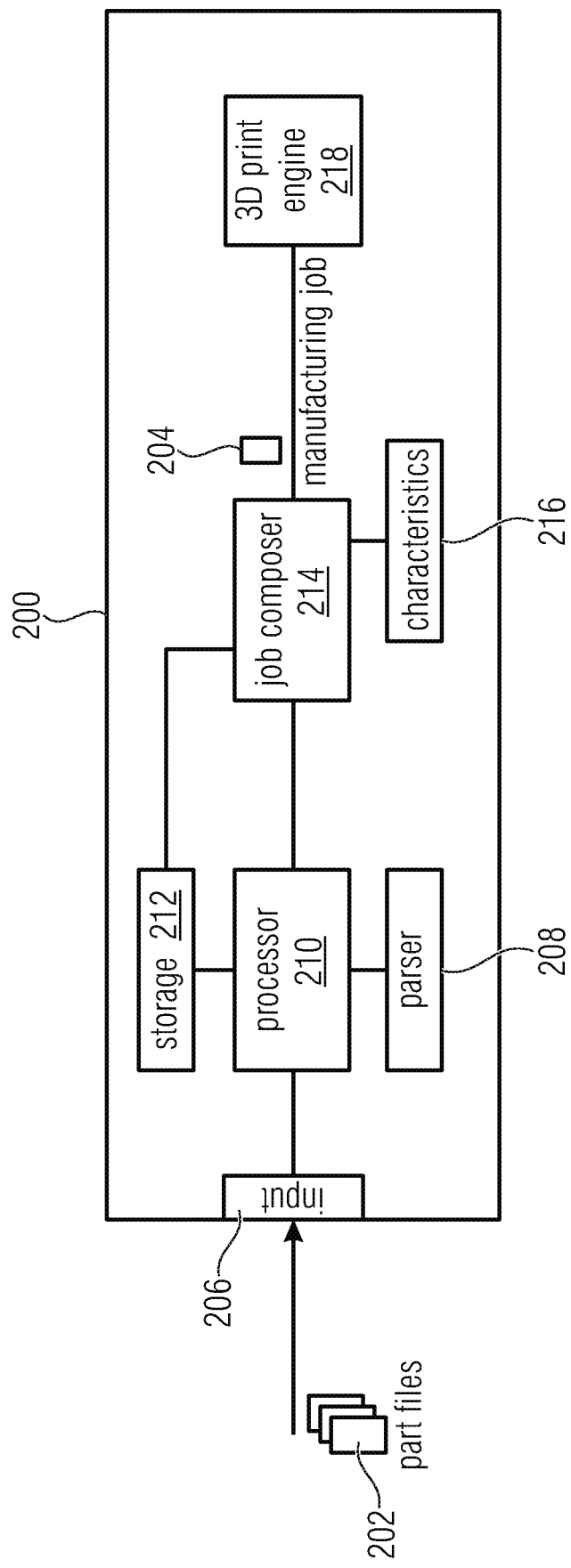
FIG. 6 is a block diagram of an additive manufacturing apparatus in accordance with an example for generating, using a plurality of part files, a manufacturing job.

FIG. 6 is a block diagram of an additive manufacturing apparatus 200 in accordance with an example for generating, using a plurality of part files 202, a manufacturing job 204. The additive manufacturing apparatus 200 includes an input 206 to receive the plurality of part files 202 to create a plurality of parts by an additive manufacturing system, such as one of the systems described above with reference to FIG. 1 to FIG. 5. Each part file has a certain file format and includes a description of a part to be created by the additive manufacturing apparatus. In the example of FIG. 6 all part files 202 have the same format. The additive manufacturing apparatus 200 includes a parser 208 to interpret the received part files. The additive manufacturing apparatus 200 includes a processor 210 to interpret the part file using the parser 208 to read the description of the part file and to store at least a portion of the description read from the part file, for example in a storage 212 of the additive manufacturing apparatus of FIG. 6. In accordance with other examples, the complete description read from the part file may be stored. In the example of FIG. 6 the parser 208 is shown separate from the processor 210. In accordance with other examples the parser 208 may be part of or may be implemented by the processor 210. The storage 212 is shown as an entity separate from the processor 210, however, in accordance with other examples, the storage 212 may be part of the processor 210 or may be a storage medium external to the additive manufacturing apparatus 200. The processor 210 repeats the interpretation and the storing for the part files received, for example for the part files describing the parts to be generated in a manufacturing job by the additive manufacturing apparatus. The additive manufacturing apparatus 200 includes a job composer 214 to generate, once the part files are processed by the processor 210, the manufacturing job 204 using the stored descriptions, for example by accessing the storage 212 and using characteristics 216 of an additive manufacturing engine 218 that is to be used for creating the plurality of parts. The manufacturing job 204 generated by the job composer 214 is provided to the additive manufacturing engine 218, also referred to as 3D print engine, for creating the plurality of parts.

Figure 7:
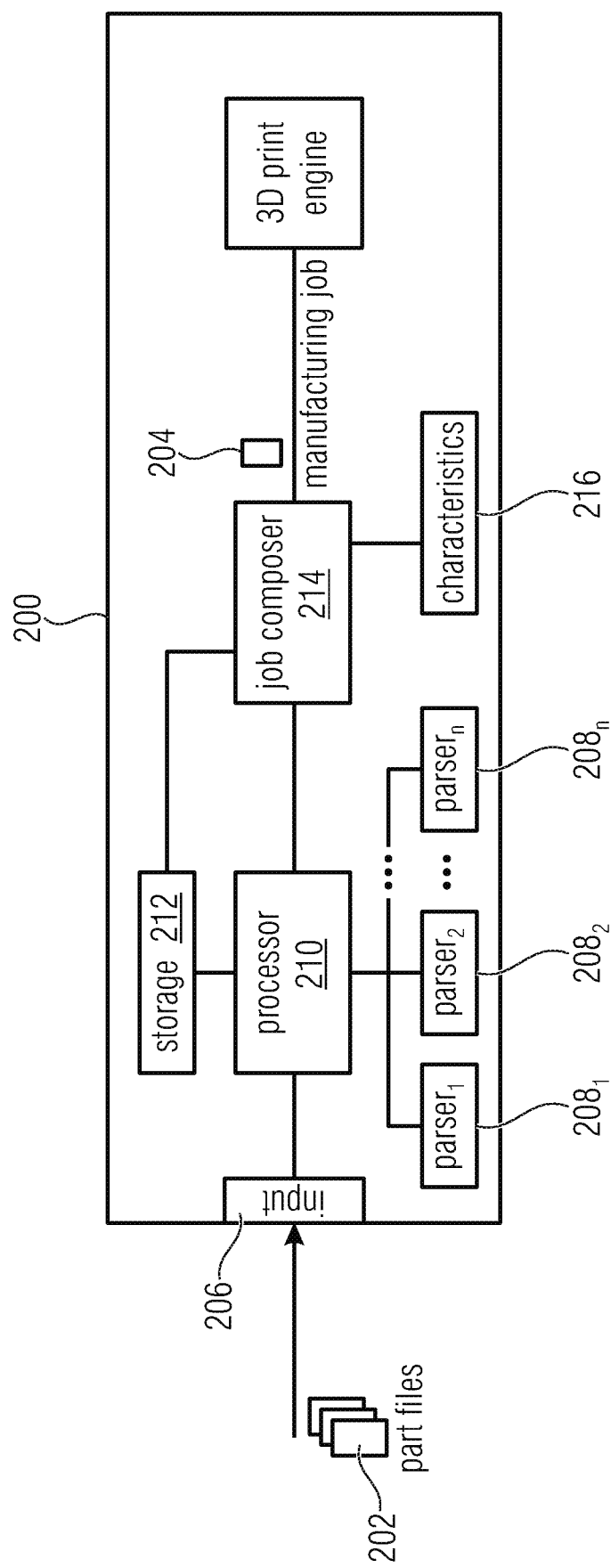
FIG. 7 is a block diagram of an additive manufacturing apparatus in accordance with another example for generating, using a plurality of part files, a manufacturing job.

FIG. 7 is a block diagram of an additive manufacturing apparatus 200 in accordance with an another example for generating, using a plurality of part files 202, a manufacturing job 204. The additive manufacturing apparatus 200 includes an input 206 to receive the plurality of part files 202 to create a plurality of parts by an additive manufacturing system, such as one of the systems described above with reference to FIG. 1 to FIG. 5. Each part file has a certain file format and includes a description of a part to be created by the additive manufacturing system. The plurality of part files may include part files having the same format or having different formats. For example, different groups of part files may be received, and the part files of one group may have a first format, while the part files of another group may have a second format, which is different from the first format. In accordance with other examples, all part files may have different formats. The additive manufacturing apparatus 200 includes a plurality of parsers $208_1$ to $208_n$ to interpret part files having different file formats. The additive manufacturing apparatus 200 includes a processor 210 to analyze a part file received at the input 206 to select one of the parsers $208_1$ to $208_n$ to interpret the part file. The processor 210 interprets the part file using the selected parser to read the description of the part file and to store at least a portion of the description read from the part file, for example in a storage 212 of the additive manufacturing apparatus of FIG. 7. In accordance with other examples, the complete description read from the part file may be stored. In the example of FIG. 7 the parsers $208_1$ to $208_n$ are shown separate from the processor 210. In accordance with other examples the parsers $208_1$ to $208_n$ may be part of or may be implemented by the processor 210. The storage 212 is shown as an entity separate from the processor 210, however, in accordance with other examples, the storage 212 may be part of the processor 210 or may be a storage medium external to the additive manufacturing apparatus 200. The processor 210 repeats the analysis, interpretation and storing for the part files received. The additive manufacturing apparatus 200 includes a job composer 214 to generate, once the part files were processed by the processor 210, the manufacturing job 204 using the stored descriptions, for example by accessing the storage 212, and by using characteristics 216 of additive manufacturing engine that is to be used for creating the plurality of parts. The manufacturing job 204 generated by the job composer 214 is provided to the additive manufacturing engine 218.

The additive manufacturing apparatus 200 may be provided as part of an additive manufacturing system, such as those described above with reference to FIG. 1 to FIG. 5. The additive manufacturing apparatus 200 may be an entity of the additive manufacturing system and receives, e.g., from a client device, a plurality of part files with different formats. For example, in the additive manufacturing systems of FIG. 1 to FIG. 5, the 3D printer 102 includes the additive manufacturing apparatus 200. In accordance with other examples, the additive manufacturing apparatus 200 may be placed at locations different from those depicted in FIG. 1 to FIG. 5.

In accordance with examples described herein, an additive manufacturing system for a 3D printer may accept a wide range of 3D languages as input files which are interpretable by the additive manufacturing apparatus. The manufacturing job or job composition may be automatically created at the 3D printer using the interpreted files and taking into consideration the characteristics of the 3D printer. Any 3D language may be processed, even 3D languages which do not have any capabilities of defining how a part is to be built by a 3D printer. This is performed by the job composer using the interpreted part file and taking into consideration the characteristics of the additive manufacturing system or of the additive manufacturing process. The job composer may consider the actual capabilities of the 3D printer when defining the actual building of the part.

Figure 8:
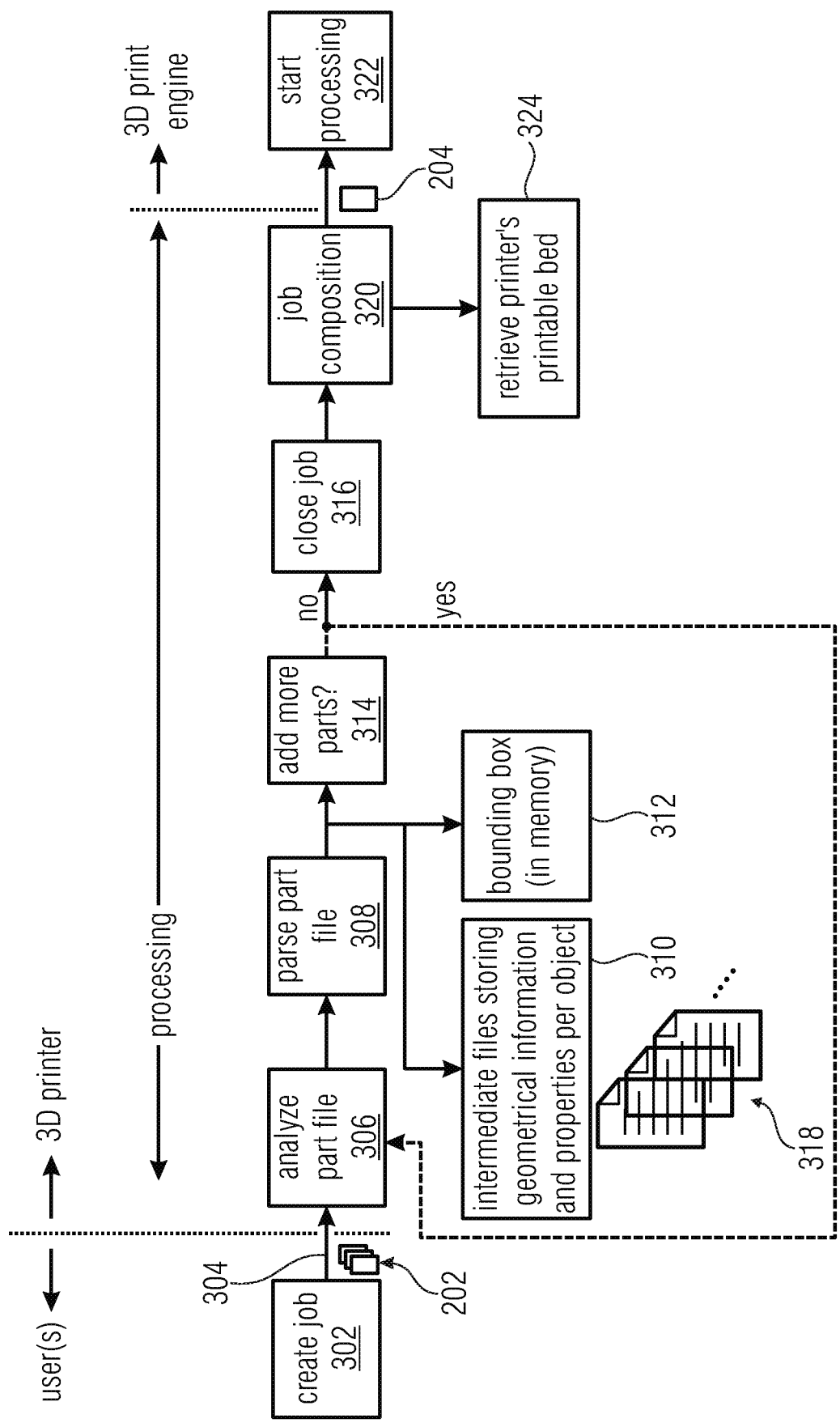
FIG. 8 is a flow diagram of an example of a process to generate a manufacturing job using a plurality of part files.

FIG. 8 is a flow diagram of an example of a process to generate a manufacturing job using a plurality of part files 202. The process 300 initially creates a task, as is indicated at 302. Creating the task 302 may include defining the plurality of parts to be created by the task using an additive manufacturing system, such as a 3D printer. The respective parts may be described by different part files 202 that may originate from tools, such as CAD tools using the same or different languages or formats describing, for example, the 3D geometry of the part. The part description may include also information for building the part by the 3D printer, however, also part files not including such a build description may be part of the task to be created. In accordance with examples, a task created at 302 may have assigned thereto a unique identifier. The task 302 may be created, for example, at a client device or by a user receiving or generating a plurality of part files and selecting from the plurality of part files those part files for defining the parts to be formed by the task. Once the task has been created at 302, the client starts to send the respective part files 202 describing the parts to be included into the task, each part file being associated with the unique identifier of the task. The sending of the part files by the client to the 3D printer is schematically indicated in FIG. 8 at 304.

A part file that has been sent by the client is analyzed in the 3D printer, as is indicated at 306, e.g., to determine a proper or suitable parser to be used for interpreting the part file. Then, the parser reads the content of the part file, as is indicated at 308. At least a portion of the content of the part file as read by the parser may be stored as an intermediate file, as is indicated at 310. In accordance with other examples, the complete content read from the part file may be stored. The content of the part file read at 308 and stored in the intermediate file at 310 may include geometrical information and properties of the part. In accordance with examples, a bounding box which may be determined using the content of the part file. The bounding box may be a cuboid in which the object or part is contained. As is indicated at 312, the computed bounding box for a part may be stored together with the intermediate file of the respective part in a memory, such as the storage 212 in the additive manufacturing apparatus of FIG. 7. In accordance with examples, the parser may also retrieve the type of content in which the 3D geometry is specified which may be different dependent on the input language, for example the 3D geometry may be specified at a triangular mesh, a volumetric raster or as polygonal slices.

Once the analysis and parsing of a part file has been completed, it is determined at 314 whether the task includes additional parts or part files. In case additional parts are in the task to be created, the next part file is analyzed and parsed, so that the process as indicated at 306 to 314 is done for every part identified to be part of the task, i.e., every part file in the task is analyzed, parsed and the respective information is stored at 310, 312. Once the client has sent all the part files, the client may close the task as is indicated at 316, for example by sending a notification that the task content is completed. Once the task is closed, the plurality of intermediate files 318 describing, for example, the geometrical information and properties of each part of the task are in the memory or storage 112, for example together with the respective bounding boxes,.

Following the closing of the task at 316, a job composition is started at 320 to generate the manufacturing job 204 that may be output to the additive manufacturing engine so that the actual building/processing of the manufacturing job 204 for creating the plurality of different parts may be started by the additive manufacturing engine, as is indicated at 322.

Figure 9:
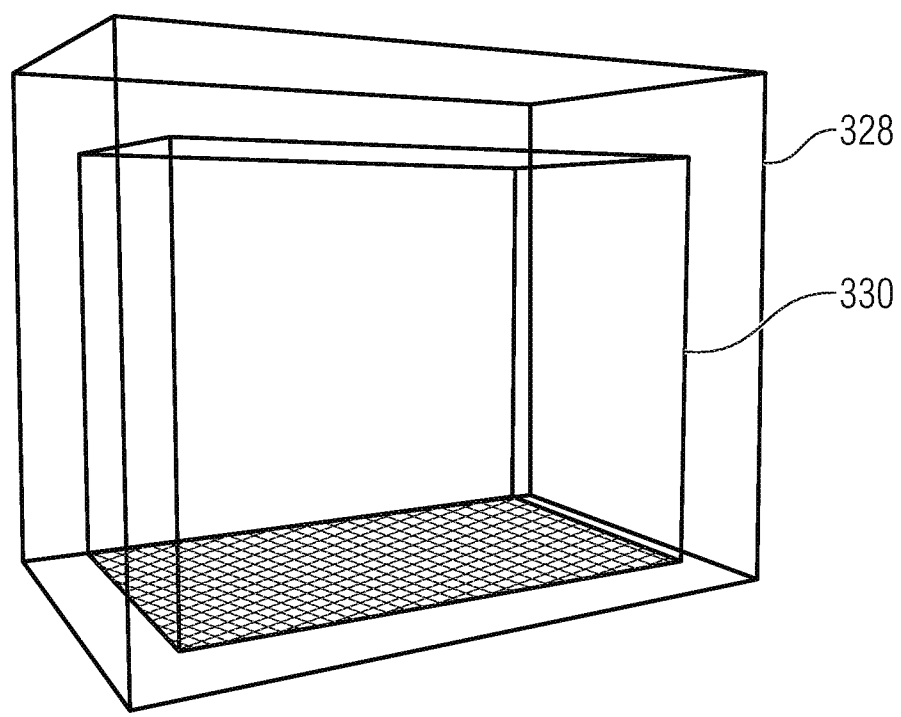
FIG. 9 depicts a 3D printer build bed box in which a printable bed box is defined according to an example.

In accordance with examples, the job composition 320 may be performed by the job composer 314 of the additive manufacturing apparatus 200. The job composition 320 may include retrieving the 3D printer's printable bed, as indicated at 324. Retrieving the printable bed may include obtaining a printable bed box as provided by the 3D printer to be used for generating the plurality of parts of the manufacturing job. For example, as is depicted in FIG. 9, a 3D printer may define a build bed box 328 in which a printable bed box 330 is defined. The build bed box 328 defines the limits within which the 3D printer may interact with the build material, and the printable box 330 may determine the location where parts may be placed, for example to obtain a certain part quality. In accordance with examples, any manufacturing job to be created defining content outside of the printable box 330 may be rejected. For example, in an additive manufacturing system as depicted in FIG. 1 to FIG. 3, the printable bed box may be obtained from the information about the build volume 108 provided in the transport device 106. In the additive manufacturing systems in accordance with the examples in FIG. 4 to FIG. 5, the printable bed box may be obtained using information about the build platform 122. In accordance with the examples depicted in FIG. 1 to FIG. 4, the build bed box may determine the dimension and limit within which the mechanics of the 3D printer may apply an agent liquid onto the build material, and in the example of FIG. 5, the build bed box dimension may determine the limits within which the laser 144 may interact with the build material.

In accordance with examples, the job composition 320 includes a 3D nesting process to determine the job using the available space provided by the 3D printer for generating the plurality of parts. The job composition 320 may include solving a 3D bin packaging job for which the printable box of the 3D printer and the bounding box 312 for every part is taken into account. This reduces the 3D bin packaging job and considering the bounding box simplifies the computation, thereby reducing the complexity for calculating a solution. The 3D bin packing job (3D-BPP) includes packing, with no overlapping, a set of three-dimensional rectangular shaped boxes, such as the above referenced bounding boxes, into a minimum number of three-dimensional rectangular shaped bins, in the examples described above, into a single bin being defined by the printable bed box. The printable bed box has a known dimension and the bounding boxes are assumed to be rotatable. To solve the 3D bin packing job, in accordance with examples, specific heuristics, metaheuristics or exact methods, such as a two-level branch and bound method, may be used.

In accordance with other examples, instead of considering the bounding boxes for the job composition process 320, the actual 3D geometry of the part, such as the actual space occupied by the part, may be considered for better use of the printable bed.

In accordance with examples of the technique described herein, the 3D printer used for creating the plurality of parts of a manufacturing job may operate on any 3D language, including a language or languages not having the capability to define the actual build. Allowing the 3D printer to perform the 3D nesting allows to make use of the functionalities provided by the 3D printer and also allows the nesting process to take into consideration feedback obtained from the current 3D printer status when determining a position at which a part is to be placed. In accordance with examples, the information retrieved by an initial or earlier parsing process and stored in the storage may be used again, when the 3D printer characteristics or 3D printer state changes. For example when the size of the printable bed changes, the actual manufacturing job 204 is newly composed using the already available information retrieved by the initial or an earlier parsing process.

Examples of the technique described herein allow the creation of a manufacturing job containing parts directly at the 3D printer without the intermediate application so that the user or users may send the part files directly to the 3D printer. The 3D printer may process part files of the same or different formats, for example the 3D printer may combine parts defined as triangular meshes with other parts defined in a volumetric raster.

In accordance with other examples, a preprocessing of the parts, prior to closing the task, may be performed, if a rotation of the part is not allowed as the rotation may invalidate the rendered content, for example when the rotation leads to the part being partially outside the printable box. If no rotation of the part is allowed, the parts may to be processed as they are received, thereby reducing the time to get the task processed and ready to be printed.

In accordance with yet other examples, during the job composition 320 considerations may be taken into account to obtain a part with a certain quality.

Although some aspects of the techniques described herein have been described in the context of an apparatus, these aspects may also represent a description of corresponding method. Analogously, aspects described in the context of a method also represent a description of corresponding blocks or items or features of a corresponding apparatus.

Figure 10:
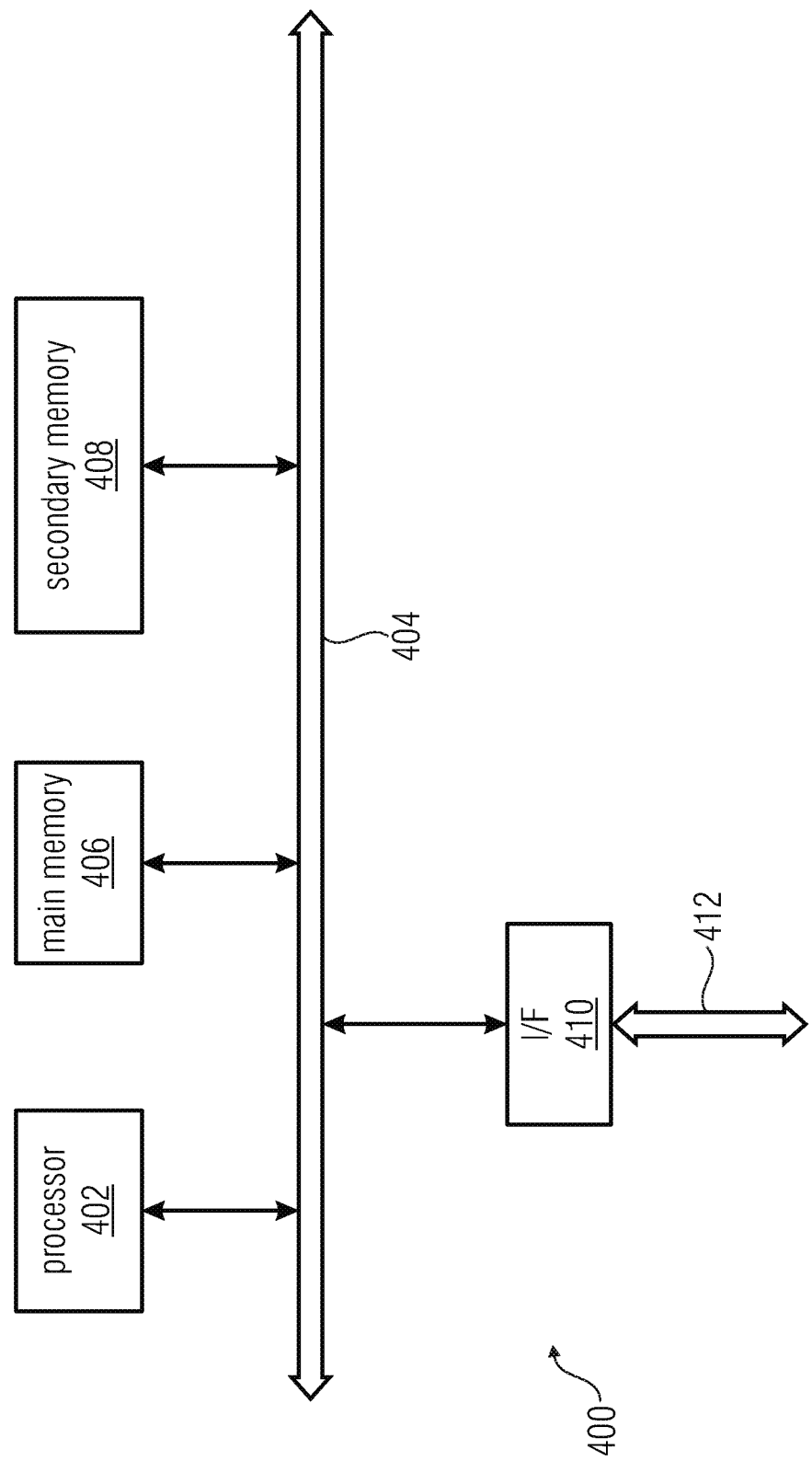
FIG. 10 illustrates an example of a processing system on which units or modules and the methods described herein may execute.

Various elements and features of the technique described herein may be implemented using analog and/or digital circuits, through the execution of machine-readable instructions by a general purpose or special-purpose processor. FIG. 10 illustrates an example of a processing system 400. The units or modules and the methods performed by these units may execute on a processing system 400. The processing system 400 includes a processor 402, such as a special purpose or a general purpose digital signal processor. The processor 402 is connected to a communication infrastructure 404, such as a bus or a network. The processing system 400 includes a main memory 406, e.g., a random access memory (RAM), and an additional memory 408, e.g., a hard disk drive and/or a removable storage drive. The additional memory 408 may allow machine-readable instructions to be loaded into the processing system 400. The processing system 400 may include a communications interface 410 to allow machine-readable instructions and data to be transferred between processing system 400 and external devices. The communication may be in the form electronic, electromagnetic, optical, or other signals capable of being handled by a communications interface. The communication may use a wire or a cable, fiber optics, a phone line, a cellular phone link, an RF link and other communications channels 412.

A machine-readable medium may generally refer to tangible storage media such as removable storage units or a hard disk installed in a hard disk drive. These machine-readable products are for providing machine-readable instructions to the processing system 400. The machine-readable instructions, also referred to as control logic, are stored in main memory 406 and/or additional memory 408. The machine-readable instructions may also be received via the communications interface 410. The machine-readable instructions, when executed, enable the processing system 400 to implement the technique described herein. Accordingly, such the machine-readable instructions may represent a controller of the processing system 400. Where the disclosure is implemented using machine-readable instructions, the machine-readable instructions may be stored in a machine-readable product and loaded into the processing system 400 using a removable storage drive or an interface, such as communications interface 410.

The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a processing system such that the respective method is performed. Examples may comprise a data carrier having electronically readable control signals, which are capable of cooperating with a processing system, such that one of the methods described herein is performed.

All of the features disclosed in this specification, including any accompanying claims, abstract and drawings, and/or all of the method bucks or processes so disclosed may be combined in any combination, except combinations where at least some of the features are mutually exclusive. Each feature disclosed in this specification, including any accompanying claims, abstract and drawings, may be replaced by other features serving the same, equivalent or similar purpose, unless expressly stated otherwise. Thus, unless expressly stated otherwise, each feature disclosed is one example of a generic series of equivalent or similar features.

The above described examples are merely illustrative for the principles of the technique described herein. It is understood that modifications and variations of the arrangements and the details described herein will be apparent to others skilled in the art. It is the intent, therefore, to be limited by the scope of the impending patent claims and not by the specific details presented by way of description and explanation of the examples herein.

The invention claimed is:

1. An additive manufacturing apparatus, comprising:
an additive manufacturing engine;
an input to receive a plurality of part files to create a plurality of parts, wherein each part file includes a description of a part to be created by the additive manufacturing engine, the plurality of part files comprising files in different formats;
a processor to
interpret a part file to read the description of the part from the part file by identifying one of a plurality of parsers that corresponds to the format of the part file and applying the identified parser to interpret the corresponding part file to retrieve the description of the part in a format used by the additive manufacturing apparatus,
store at least a portion of the description of the part, and repeat the interpretation and storing for each of the received part files; and
a job composer to generate a manufacturing job using the stored descriptions and using characteristics of the additive manufacturing engine, and to provide the generated manufacturing job to the additive manufacturing engine.

2. The additive manufacturing apparatus of claim 1, wherein the plurality of part files comprises a group of a plurality of files that have the same format and one or more of the plurality of part files have a different format.

3. The additive manufacturing apparatus of claim 2, wherein the processor is to apply a same parser to interpret the part files of the group of files having the same format.

4. The additive manufacturing apparatus of claim 1, wherein the processor is to
analyze a part file to select a parser to interpret the part file, and
interpret the part file using the selected parser to read the description of the part file.

5. The additive manufacturing apparatus of claim 4, wherein the plurality of part files includes a first part file and a second part file, and wherein the first part file has a first format and the second part filed has a second format different from the first format.

6. The additive manufacturing apparatus of claim 1, wherein the processor is to determine a space occupied by the part using the description of the part.

7. The additive manufacturing apparatus of claim 6, wherein the processor is to calculate, using the description of the part, a bounding box which is a cuboid in which the part is contained.

8. The additive manufacturing apparatus of claim 1, wherein the characteristics of the additive manufacturing system include a build bed box dimension or a printable box, wherein the build bed box dimension determines the limits of the additive manufacturing system to interact with a build material, and wherein the printable box determines the locations where parts are placeable.

9. The additive manufacturing apparatus of claim 1, wherein the input is to receive the plurality of part files from a client device or from a plurality of client devices, wherein the input receives an indication that sending the part files for the manufacturing job is completed, and wherein the processor, responsive to the indication, generates the manufacturing job.

10. The additive manufacturing apparatus of claim 1, wherein the manufacturing job has assigned thereto a unique identifier, and wherein a part file belonging to the manufacturing job is identified by the unique identifier.

11. The additive manufacturing apparatus of claim 1, wherein the job composer is to optimize a space provided by the additive manufacturing engine for generating the plurality of parts.

12. The additive manufacturing apparatus of claim 11, wherein the job composer includes a 3D nesting process to solve a 3D bin packing job, wherein the 3D bin packing job includes packing, without overlap, a set of three-dimensional rectangular shaped boxes into a minimum number of three-dimensional rectangular shaped bins, wherein all the bins have identical known dimensions, and wherein the boxes are rotatable.

13. The additive manufacturing apparatus of claim 12, wherein
a three-dimensional rectangular shaped box includes a bounding box of a part described by a part file,
a three-dimensional rectangular shaped bin includes a printable bed box of the additive manufacturing system, the printable bed box determining locations at which a part is placeable,
the processor is to compute the bounding box and to store the bounding box along with the read description, and
the job composer is to generate the manufacturing job using the printable bed box and the bounding box of the parts.

14. The additive manufacturing apparatus of claim 1, further comprising parsers within the plurality of parsers for a range of different 3D languages which will be interpretable by the additive manufacturing apparatus.

15. The additive manufacturing apparatus of claim 14, wherein the range of different 3D languages includes at least one 3D language that does not include a capability of defining how a part is to be built by an additive manufacturing apparatus.

16. The additive manufacturing apparatus of claim 1, wherein the processor is to store content from each part file as an intermediate file; the job composer to access the intermediate files for all the parts in a specified task to generating the manufacturing job.

17. A method, comprising:
   receiving, at an additive manufacturing system, a plurality of part files in different formats to create a plurality of parts, wherein each part file includes a description of a part to be created;
   interpreting the plurality of part files in the different formats to read the description of the parts from the part files, and storing at least a portion of the read descriptions of the part files;
   generating a manufacturing job using the stored descriptions and using a characteristic of the additive manufacturing system to be used for creating the plurality of parts; and
   applying the manufacturing job to an additive manufacturing engine of the additive manufacturing system;
   wherein a first part file defines a first part with polygonal meshes and as second part file defines a second part with a volumetric raster.

18. A non-transitory machine-readable storage medium comprising instructions executable by a processor, the machine-readable storage medium comprising:
   instructions to cause an additive manufacturing system to receive a plurality of part files, wherein each part file includes a description of a part to be created;
   instructions to process each of the received part files, wherein the instructions to process each of the plurality of part files include
      instructions to interpret the part file to read the description of the part from the part file, and
      instructions to store at least a portion of the read description of the part file;
   instructions to generate a manufacturing job using the stored descriptions and using characteristics of the additive manufacturing system to be used for creating the plurality of parts; and
   instructions to operate an additive manufacturing engine of the additive manufacturing system using the manufacturing job;
   wherein the storage medium further comprises a parser for interpreting a 3D language that does not include a capability of defining how a part is to be built by an additive manufacturing apparatus.

* * * * *